April 8, 1969   D. J. BOES ET AL   3,437,592
ELECTRICALLY CONDUCTIVE SOLID LUBRICANT MEMBERS AND
APPARATUS EMPLOYING THEM
Original Filed Nov. 4, 1963

INVENTORS
David J. Boes and
Lawrence E. Moberly
BY
*Frederick Hague*
ATTORNEY

3,437,592
ELECTRICALLY CONDUCTIVE SOLID LUBRICANT MEMBERS AND APPARATUS EMPLOYING THEM

David J. Boes, Monroeville, and Lawrence E. Moberly, Penn Hills, Pa., assignors to Westinghouse Electric Corporation, Pittsburgh, Pa., a corporation of Pennsylvania
Original application Nov. 4, 1963, Ser. No. 321,302, now Patent No. 3,300,667, dated Jan. 24, 1967. Divided and this application Dec. 12, 1966, Ser. No. 600,822
Int. Cl. C10m 7/06, 5/02; F16c 29/00
U.S. Cl. 252—12        8 Claims

ABSTRACT OF THE DISCLOSURE

Tantalum diselenide, tantalum disulfide and niobium disulfide are employed as solid lubricants for bearings, being incorporated in the bearings themselves or applied as a suspension in a liquid carrier.

---

This application is a division of our application Ser. No. 321,302, filed Nov. 4, 1963, now Patent 3,300,667.

The use of solid materials as lubricants is becoming increasingly important as the operating conditions of various systems requiring lubrication exceeds those where organic or semi-organic liquid lubricants are reliable. The current activity in space exploration has spurred the search for lubricants which can withstand ultra high vacuum environments or high radiation levels without excessive evaporation or deterioration of lubricating properties.

One of the materials frequently used as such a solid lubricant is graphite. It has proven ability to reduce friction and wear of metal surfaces in sliding contact with one another at elevated temperatures. However, one serious drawback to its use as a solid lubricant is its inability to reduce friction and wear in the absence of water vapor, a condition which exists in high altitude and outer space environments. A second group of compounds which has shown good anti-wear and friction properties is molybdenum disulfide and related compounds. Although not quite as stable from an oxidation standpoint as graphite, these compounds remain unaffected, from a lubrication standpoint, by the absence of water vapor.

A particularly troublesome problem area has been found to exist in electrical sliding contacts, such as electric brushes in dynamoelectrical machines, such as motors and generators, where both good electrical conductivity together with some degree of lubrication are required. In most common applications brushes comprising ordinary carbon or graphite or both are quite adequate. However, in high altitude or space applications such brushes may disintegrate in an hour or less, and must be furnished with some additional lubricating means. One such method has been the incorporation into carbon brushes, by diverse schemes, of effective quantities of solid lubricants of the molybdenum disulfide type. These solid lubricants include most of the disulfides, diselenides and ditellurides of molybdenum, titanium, tungsten and zirconium. While these solid lubricant additives have provided adequate brush lubrication, they, because of their high electrical resistance, present additional problems, by way of erratic and high brush-commutator contact resistance which often renders proper operation of dynamoelectric machines difficult.

Thus there has developed somewhat of a dilemma in electrical sliding contact design for space or other severe applications in that a proper balance between lubricating effectiveness and minimum electrical losses must be achieved.

Accordingly, it is a primary object of the present invention to provide for improved self-lubricating electrical sliding contacts of such quality as to minimize electrical losses and contact resistance, the contact being suitable for use in low pressure or vacuum and low oxygen applications.

Another object of the invention is to provide solid lubricant members possessing good electrical conductivity and being highly useful in bearings and other mechanical devices requiring good lubrication.

Another object of the invention is to provide, in dynamoelectric machines, improved self-lubricating sliding electrical contact members characterized by minimum contact resistance losses, the contacts being suitable for low pressure or vacuum and low oxygen applications over a wide range of temperatures.

Another object is to provide a method for lubricating surfaces in movable contact with one another by disposing therebetween one or more of selected solid lubricants, alone or in combination with fluid vehicles or suspension media.

Another object is to provide a method for lubricating surfaces in movable contact with one another by disposing at least at one such surface a bonded lubricating layer or film comprising one or more of selected solid lubricants and a resin or metal binder.

Another object is to provide a method for improving anti-friction properties of a member subject to mechanical friction by applying at least to the friction subjected face thereof, one or more of selected solid lubricants alone or in combination with resin or metal binders or in combination with fluid vehicles or suspension media.

Another object of the invention is to provide for articles of manufacture comprising members suitable for relative movement with respect to other members with low friction therebetween, the members exhibiting at least at the contacting faces thereof a lubricating film comprising one or more of selected solid lubricants alone or in combination with resin or metal binders or in combination with fluid vehicles or suspension media.

These and other objects of the invention will become apparent from the following detailed description when taken in conjunction with the accompanying drawings, in which.

Basically, the present invention relates to the novel application of certain solid materials possessing the highly unusual combination of both good anti-friction and good electrical conducting properties. These materials are niobium disulfide and the diselenide and disulfide of tantalum.

It has been found that these compounds exhibit a remarkable combination of properties. Their lubricating or anti-friction properties are generally superior to both graphite and such solid lubricants as molybdenum disulfide while their electrical conductivity properties are substantially equivalent to graphite. From an oxidation standpoint tantalum diselenide is stable to about 300° C and the disulfides, tantalum and niobium, to about 200° C. to 250° C. in air. All three compounds are thermally stable in a neutral or non-oxidizing gas or under vacuum up to over 1000° C. Thus they may be used as a lubricant throughout a relatively wide temperature range under a variety of conditions. These compounds always have an unpaired electron which accounts for their electrical conductivity. Hereinafter in this specification these compounds are designated as the disclosed lubricant compounds.

A comparison of the lubricating qualities and electrical resistivity of disclosed lubricant compounds molybdenum disulfide and graphite is illustrated in Table I.

TABLE I

| Compound | Resistivity, ohm-cm. | Friction coefficient, 80 p.s.i. | | |
|---|---|---|---|---|
| | | 7 f.p.m. | 35 f.p.m. | 70 f.p.m. |
| C | $1.4 \times 10^{-3}$ | .13 | .14 | .16 |
| $MoS_2$ | 851 | .23 | .21 | .17 |
| $TaSe_2$ | $2.23 \times 10^{-3}$ | .136 | .084 | .10 |
| $TaS_2$ | $3.33 \times 10^{-3}$ | .066 | .033 | .068 |
| $NbS_2$ | $3.08 \times 10^{-3}$ | .165 | .098 | .098 |

The coefficients of friction were determined by pressing a rotating button of the respective lubricants against a stainless steel disk at 25° C. in air.

As can be seen Table I compares the friction coefficient at 80 p.s.i. pressure between sliding surfaces for speeds of 7, 35 and 70 feet per minute, the tests being performed at room temperature in air. The advantages of the compounds for the invention, both from the standpoint of electrical resistivity and lubrication are obvious in viewing Table I.

This unexpected combination of properties renders the compounds for the invention highly useful as a lubricant in sliding electrical contacts such as electrical brushes.

Figure 1:
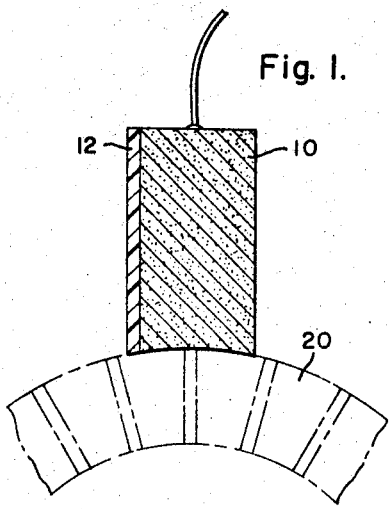
FIGURE 1 is an elevation, in cross-section, of a self-lubricated electrical contact brush.
Figure 2:
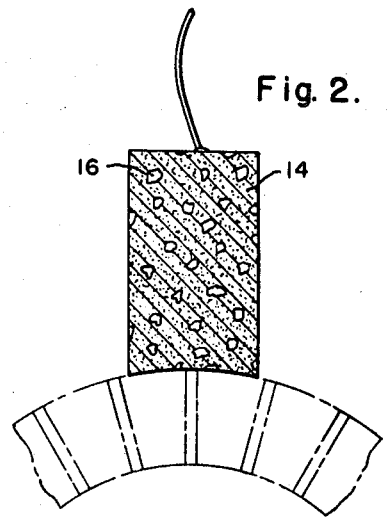
FIG. 2 is an elevation, in cross-section, of a self-lubricated electrical contact brush.

Carbon or graphite electrical brushes particularly suitable for use in high altitude or space applications have incorporated therein effective amounts, generally about from 5% to 20% of the total weight of the brush, of the lubricant compounds disclosed herein. As the lubricating ability of graphite is diminished at low partial pressures of oxygen and in the absence of water vapor, these compounds enable low friction between the brush and commutator. Suitable methods of such solid lubricant incorporation are illustrated in FIGS. 1 and 2 which, respectively illustrate (1) an electrical graphite brush 10 with a face 12 comprising a layer of a lubricant compound disclosed herein and (2) another electrical brush 14 with particles of lubricant compound, such as indicated by the numeral 16, distributed throughout the brush body, both operating against a commutator 20. Where with molybdenum disulfide the particle size should be large, where low contact resistance is desired, the disclosed lubricant compounds may be used in any particle size.

The lubricants disclosed herein can be present in any amount without seriously jeopardizing the integrity of an electrical sliding contact or brush. The commutator 20 in FIG. 1 may be a slip ring. It may be of copper base alloy or of silver. Alternatively, a copper contact similar to brush 10 may be pressed against a commutator or slip ring comprising graphite or copper and a disclosed lubricant compound.

While as little as ½% of a disclosed lubricant compound is usefully added to carbon brushes, larger amounts of the order of 5% and more may be present for best results in high vacuum conditions. For example, a brush of essentially pure tantalum diselenide is operative. However, this brush may tend to film excessively thus tending to slightly increase friction. In this respect it should be noted that the disulfides, both tantalum and niobium, exhibit much less filming than tantalum diselenide. However, since it is expected that most, if not all, sliding contacts or brushes will contain substantially less than 100% of the disclosed lubricant compounds this filming, even in the case of tantalum diselenide, is not considered to be a serious problem. That is, generally speaking, an electrical contact will comprise less than 15% by weight of the disclosed compounds. In such a case the filming would be only a small fraction of that exhibited by the essentially pure lubricant brush. Thus, while any amount of the disclosed lubricant compounds will be of benefit as a lubricant in a sliding electrical contact, for high altitude or vacuum applications a preferred composition for the disclosed lubricant compounds in a carbon contact such as a carbon brush is about 5% based on the total weight of the contact. Generally speaking, preferable composition ranges of a carbon brush would be about 5% to 35% of the disclosed lubricant compounds with an optimal composition range being about 10% to 20% based on the weight of the entire contact or brush. The term "carbon" as applied herein to a contact or brush, is to be construed to apply to carbon or graphite or mixtures thereof.

The above mentioned disclosed lubricant compound composition ranges for carbon electrical contacts or brushes also apply to non-carbon contact members. For example, sliding electrical contacts of metals such as silver, gold, platinum, copper and their alloys may be effectively lubricated by the incorporation therein of the disclosed lubricant compounds in the amounts disclosed above for the carbon contacts. These non-carbon contacts offer great promise in certain highly critical space applications where it is desired to pass a high electrical current through a sliding electrical contact with the minimum contact resistance.

Another advantage afforded by the electrical conductivity and low friction properties of the disclosed lubricant compounds in its use in electrical apparatus appears in certain applications where it is desired to effectively ground a rotating shaft, such as an A.C. rotor shaft. This shaft could be effectively grounded through a bearing lubricated with one of the disclosed lubricant compounds which, because of its conductivity, will permit effective grounding of the rotating shaft through the bearing support while maintaining good anti-friction properties.

It is preferred that the disclosed lubricant compounds to be used as a lubricant in accordance with the invention be treated to remove any free selenium or sulfide. When these compounds are synthesized by reacting stoichiometric proportions of their elemental constituents, it has been found that there is almost invariably present in the compound a small amount of free anion material. By heating the particular compound to a temperature in excess of the vaporization temperature for sulfur or selenium, as applicable, while subjecting it to a vacuum any free anion material is removed. For example, a quantity of tantalum diselenide may be heated to about 400° C. or higher at a vacuum level of about 5 millimeters of mercury absolute pressure or less with some means of condensing the selenium vapor. For excess sulfur removal the temperature required would be only 300° C. to 350° C. as compared to the 400° C. for selenium removal. Other conditions for excess sulfur removal would be the same as for selenium removal. The advisability of performing this heat treatment, of course, depends on the particular application. While the presence of a slight excess of selenium or sulfur is generally not detrimental to the use of the disclosed lubricant compounds in relatively non-critical applications such as most common carbon brush applications, their presence would seriously hinder lubricant incorporation into a brush, bearing or other member by methods such as sintering. For example, in the incorporation of untreated tantalum diselenide into a powdered silver compact followed by sintering, the presence of excessive selenium which would vaporize at the sintering temperatures of silver would tend to form gas pockets in the member or, further, may react or alloy with the other constituents of the member, thereby seriously impairing its conductivity and integrity. The above illustrated low temperature heat treatment avoids these problems.

While presenting outstanding advantages in sliding electrical contacts, the good lubricating qualities of the disclosed lubricant compounds will enable good results in other applications. Since these compounds as lubricants are, generally speaking, equal to or better than known solid lubricants such as molybdenum disulfide, its use in various applications requiring lubrication is immediately apparent.

For a better understanding of the application and scope of the invention, reference should be made to the following examples which are illustrative embodiments of the invention.

Example I

A carbon brush is formed by combining in relatively small particle sizes (in the order of 40 microns) carbon in the desired form, either graphite or ordinary carbon or mixtures of both as desired, with about 15% based on the weight of the brush of tantalum diselenide, and about 25% based on the weight of the dry carbon-tantalum diselenide powders, of a resin binder such as a phenolic, thoroughly admixing the ingredients and compressing at about 1000 p.s.i. pressure at about 100° C. to 200° C. for about ½ hour into a body. The body is baked in a non-oxidizing atmosphere at about 800° C. for 4 hours. The resulting brush will be self-lubricating and exhibit very low contact resistance and, further, be suitable for high altitude or even vacuum applications. If desired niobium or tantalum disulfide may be used in addition to or in lieu of tantalum diselenide in forming this brush.

By methods well known in the art, substantial amounts, even up to 50% or more by weight, of certain additives, such as metal halides for example lead iodide, are often incorporated into carbon brushes to impart cerain desired properties. Such additives may be incorporated into the carbon brush formed in Example I by a post treatment. However, with the carbon brushes of this invention, generally speaking, smaller quantities of such additives are used or they may be entirely eliminated.

Example II

An electrical contact brush is formed by thoroughly admixing in relatively small particle sizes (of the order of 40 microns) about 15% based on the weight of the brush of niobium disulfide and the balance comprising chiefly silver, then cold pressing this mixture at about 50,000 p.s.i. pressure at 100° C. and finally sintering the resulting compact at about 750° C. for 6 hours in an inert atmosphere or vacuum. The resulting brush will exhibit unusually high electrical conductivity since silver is a superior conductor when compared to carbon and will exhibit excellent self-lubricating characteristics. It is to be noted that the niobium disulfide used in manufacturing the silver brush should first be treated so as to remove any excess sulfur by heating it to about 300° C. in a vacuum level of about 5 millimeters of mercury absolute pressure, so as to preclude any bloating of the sintered silver. Similarly, brushes may be formed using tantalum disulfide or diselenide as the lubricant.

Example III

Figure 3:
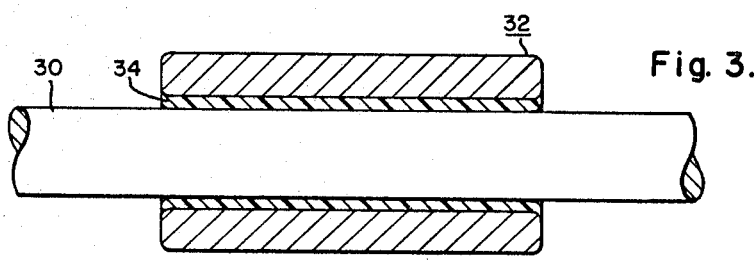

A sleeve bearing is lubricated by the practice of the invention as follows. Referring to FIG. 3, shaft 30 rotates in a sleeve bearing 32. Disposed in sleeve 32 is a bearing liner 34 of a composite containing an effective amount, for example about 25% by weight of tantalum disulfide in a resin (for example a phenolic) or sintered metal binder. The bearing will not require any external lubricant.

In order to effectively ground the said shaft 30 through bearing 32 as for example if 30 were the rotor shaft in an A.C. electric motor, the bearing 32 could be constructed of a conductive material such as bronze in which is incorporated by weight about 25% niobium disulfide either throughout the entire bearing or in merely a bearing liner 34, if present. This lubricant incorporation would be accomplished by sintering the thoroughly admixed and compacted bronze and niobium disulfide powders for about 6 hours at 800° C.

Example IV

Figure 4:
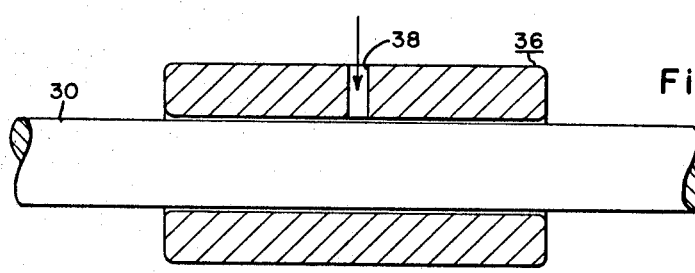
FIGS. 3 to 5 are elevations, partly in cross-section, of an embodiment of the invention in bearings.

Referring to FIG. 4, there is illustrated another bearing structure comprising a shaft 30 rotating in a sleeve type bearing 36 provided with a lubricant aperture 38. Into the aperture 38, there is introduced an effective quantity of tantalum diselenide suspended in oil, water, or any other suitable medium depending on the particular application.

If a rotating shaft has an area along its length supported by a bearing which is subjected to friction, this area is coated with niobium disulfide to improve its anti-friction properties. That is, referring to FIG. 3, the length of the shaft 30 which is situated within bearing 32 may be treated by the application of niobium disulfide to this surface in order to improve its anti-friction qualities especially during any periods of break-in.

Example V

Figure 5:
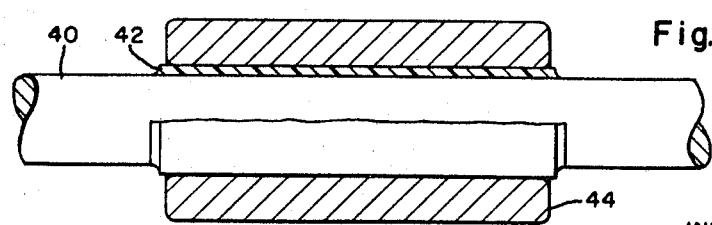

Tantalum diselenide is incorporated in a bearing by the applicaton to the surface of the rotating shaft of a bonded layer embodying tantalum diselenide as is illustrated in FIG. 5 wherein shaft 40 is rotating within and supported by sleeve bearing 44. A layer 42 comprising about 20% tantalum diselenide in a resin binder, is bonded to the shaft 40.

Example VI

Self-lubricating copper commutator bars or copper slip rings for use in dynamoelectric machines may be formed by mixing small particles in amounts of about 4% by weight tantalum diselenide with the balance essentially comprising silver bearing copper, cold pressing the composite under about 25,000 p.s.i. to 50,000 p.s.i. pressure at about 150° C. and then sintering at about 850° C. to 900° C. in a non-reactive gas or vacuum for about 4 or 5 hours. The resulting member may then be machined into commutator bars or slip rings which will possess self-lubricating properties in contact with carbon brushes without serious impairment of electrical conductivity qualities. Obviously similar members could be formed using other metals and materials, for example silver.

In members subject to mechanical friction, such as the bearing applications illustrated in FIGS. 3, 4 and 5, in a preferred composition for the bearing components the range for the disclosed lubricants is from about 15% to 30% of the total weight of the member. However, it should be noted that the preferable or the optimum composition will vary with the application. For example where the disclosed lubricant is incorporated into a resin which itself offers some lubrication characteristics, such as polytetrafluoroethylene, considerably less is incorporated than where the binder is a phenolic resin or sintered metal which offers no substantial lubrication.

It is to be understood that while FIGS. 3 and 4 describe the application of the invention with particular reference to sleeve bearings, the invention is not to be so limited.

The invention will find use in any aplication where it is desired to reduce friction between surfaces in movable contact with one another. Such applications include ball or roller bearings, gears, cams and many others.

Other solid lubricants may be added to or combined with the disclosed lubricants. Thus graphite and molybdenum disulfide may be included or admixed with the disclosed lubricants.

It is to be understood that the above description and drawings are illustrative and not in limitation of the invention or its application.

We claim as our invention:

1. A bearing member having a surface portion adapted to bear against a relatively moving member, a solid lubricant present on said surface portion to provide for a low coefficient of friction when said relatively moving member is in contact therewith, the solid lubricant consisting essentially of at least one compound selected from the group consisting of tantalum diselenide and the disulfides of tantalum and niobium, the solid lubricant being characterized by a low electrical resistivity of from about 2.2 to $3.3 \times 10^{-3}$ ohm-cm., and good lubrication properties nuder high vacuum conditions.

2. The bearing member of claim 1, wherein a layer bonded to at least the said surface portion of the bearing comprises the solid lubricant and a binder.

3. The bearing member of claim 2 wherein the binder is a resinous material.

4. The bearing member of clam 2 wherein the binder is a compacted metal powder in which the solid lubricant is admixed.

5. The bearing member of claim 2 wherein the solid lubricant comprises from 15% to 30% of the layer.

6. The bearing member of claim 1, comprising a sintered metal powder matrix having distributed therein the solid lubricant.

7. The bearing member of claim 1 comprising a resin body and the powdered solid lubricant admixed therein.

8. The bearing member of claim 1 wherein the solid lubricant is suspended in a liquid carrier and the bearing member includes means for introducing the solid lubricant suspended in the liquid carrier at the said surface portion.

References Cited

Dry Lubricated Bearings for Operation in a Vacuum," by Bowen in ASLE Transactions, vol. 5, No. 2, November 1962, pages 315–320.

"Friction-Wear Characteristics of Self-Lubricating Composites Developed for Vacuum Service" by Boes et al. in ASLE Transactions, Vol. 6, No. 3, July 1963; pages 192–195.

DANIEL E. WYMAN, *Primary Examiner.*

J. VAUGHN, *Assistant Examiner.*

U.S. Cl. X.R.

252—25